United States Patent [15] 3,651,640
Nicita [45] Mar. 28, 1972

[54] GAS TURBINE ENGINE WITH AERODYNAMIC TORQUE CONVERTER DRIVE

[72] Inventor: John Nicita, Ann Arbor, Mich.
[73] Assignee: Power Technology Corporation, Ann Arbor, Mich.
[22] Filed: Sept. 25, 1970
[21] Appl. No.: 75,612

[52] U.S. Cl. .............................................................. 60/39.24
[51] Int. Cl. ............................................. F02c 9/02, F02c 9/14
[58] Field of Search ................ 60/39.24, 39.03, 39.15, 39.16

[56] References Cited
UNITED STATES PATENTS
3,314,232   4/1967   Hill ........................................ 60/39.24
3,500,637   3/1970   Toy ..................................... 60/39.24 X Primary Examiner—Clarence R. Gordon
Attorney—Barnes, Kisselle, Raisch & Choate

[57] ABSTRACT

A gas turbine engine and an aerodynamic torque converter coupled through fluid lines such that the aerodynamic torque converter is filled with a compressible fluid and a hydraulic system for controlling the coupling between the gas turbine engine and aerodynamic torque converter to vary the density of the compressible fluid during starting, idle, and normal operation.

14 Claims, 4 Drawing Figures

3,651,640

GAS TURBINE ENGINE WITH AERODYNAMIC TORQUE CONVERTER DRIVE

This invention relates to gas turbine engines and the transmission of power from gas turbine engines to perform work.

BACKGROUND OF THE INVENTION

In the patent to Charles C. Hill U.S. Pat. No. 3,314,232, there is disclosed and claimed a drive system whereby the output of a gas turbine engine is utilized to drive an aerodynamic torque converter filled with compressible fluid thereby producing variable torque-speed characteristics without high speed gearing.

Among the objects of the present invention are to provide a novel control system for the gas turbine engine with aerodynamic torque converter drive such as shown in the patent to Hill.

SUMMARY OF THE INVENTION

In accordance with the invention, a control system is provided for controlling a gas turbine engine and an aerodynamic torque converter coupled through fluid lines such that the aerodynamic torque converter is filled with a compressible fluid. The control system comprises a hydraulic system for controlling the coupling between the gas turbine engine and the aerodynamic torque converter to vary the density of the compressible fluid during starting, idle, and normal operation.

DESCRIPTION

Figure 1:
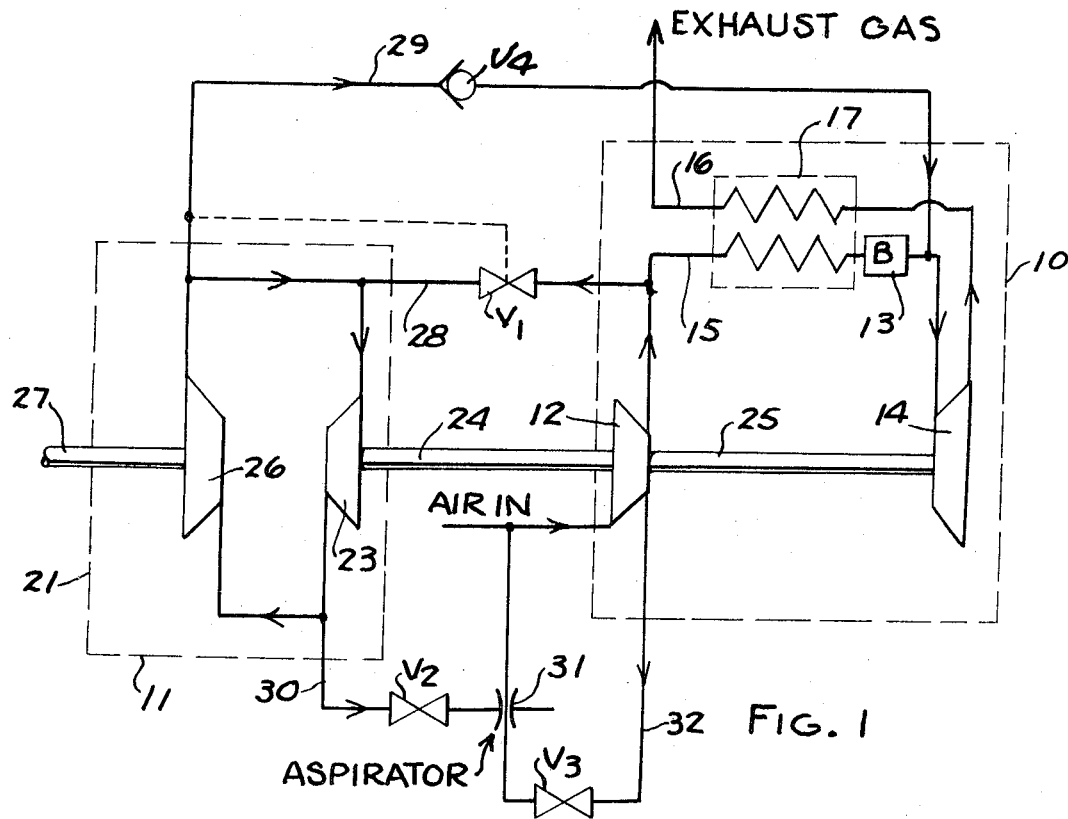
FIG. 1 is a diagrammatic view of a gas turbine engine drive system embodying the invention.

Referring to FIG. 1, the drive system embodying the invention comprises a gas turbine engine 10 and an aerodynamic torque converter 11, coupled as in the aforementioned U.S. Pat. No. 3,314,232. Gas turbine engine 10 comprises a compressor 12, burner 13, and turbine 14. A portion of the output of the compressor 12 in the form of compressed air flows through a fluid line 15 to the burner 13 of the gas turbine 10. The exhaust gases from the turbine 12 flow through line 16 to the atmosphere. Preferably the lines 15, 16 are in heat exchange relationship as at 17.

In accordance with the invention, aerodynamic torque converter 11 is provided and has a casing 21, preferably with fixed guide vanes and an input rotor 23 that is connected by a shaft 24 to the output shaft 25 of the engine 10. The casing 21 is adapted to be filled with compressible fluid, namely, air, from the compressor so that upon rotation of the rotor 23, the flow of air exerts a torque which is provided to rotate an output rotor 26 and, in turn, the output shaft 27 of the aerodynamic torque converter, the flow of air being in the path of the arrows within casing 21. Output rotor 26 may be part of a single or multi stage turbine. Torque converter 11 is preferably of the outward radial flow turbine type. As shown in the drawing, torque converter 11 comprises a single stage of compression and expansion but the torque converter may have multiple stages of compression and/or expansion. Axial flow turbomachinery may also be used.

Compressible fluid in the form of compressed air may flow from the gas turbine compressor 12 to the casing 21 through a first fluid line 28. In order to control the density of the fluid in the casing 21 and to provide for a steady through flow for cooling, a second fluid line 29 extends from the casing to the combustor line 14 at the outlet of the combustor 13.

In order to provide control, valve $V_1$ is provided in line 28. A line 32 flows from the gas turbine compressor to an aspirator 31 that in turn controls the flow in a line 30 extending from the casing of the aerodynamic torque converter for evacuating the torque converter. Valve $V_3$ is provided in line 32. Valve $V_2$ is provided in line 30.

It can thus be seen that a control system in accordance with the invention will alter circuit air density for the various modes of operation. The system will perform the following:
1. Evacuate the converter for starting and idling.
2. Provide maximum converter pressure and cooling flow for stall and coast operations.
3. Provide maximum converter pressure and modulate cooling air flow to maintain aerodynamic torque converter circuit temperature at a predetermined value to modulate circuit density for all other operating modes.

In accordance with the invention, $V_1$ comprises a hydraulically operated and temperature modulated valve to control the flow of cooling air in line 28 from the engine 10 into the converter 11. $V_2$ comprises a hydraulically operated on-off valve that will allow evacuation of the converter for start/idle operation. $V_3$ comprises a hydraulically operated on-off valve that controls compressor bleed air to aspirator 31 for evacuation of the converter circuit. $V_4$ comprises a check valve that allows cooling air flow to return to the gas turbine circuit when the converter is pressurized and prevents back flow into the converter when the converter is evacuated.

Figure 2:
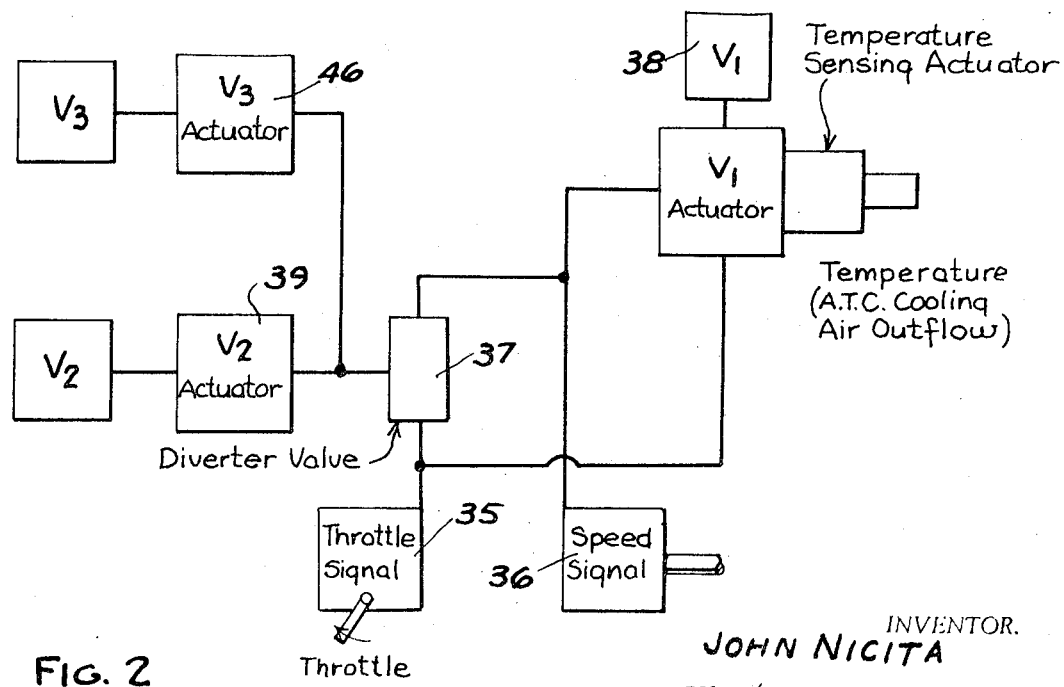
FIG. 2 is a schematic diagram of the control portion of the system.
Figure 3:
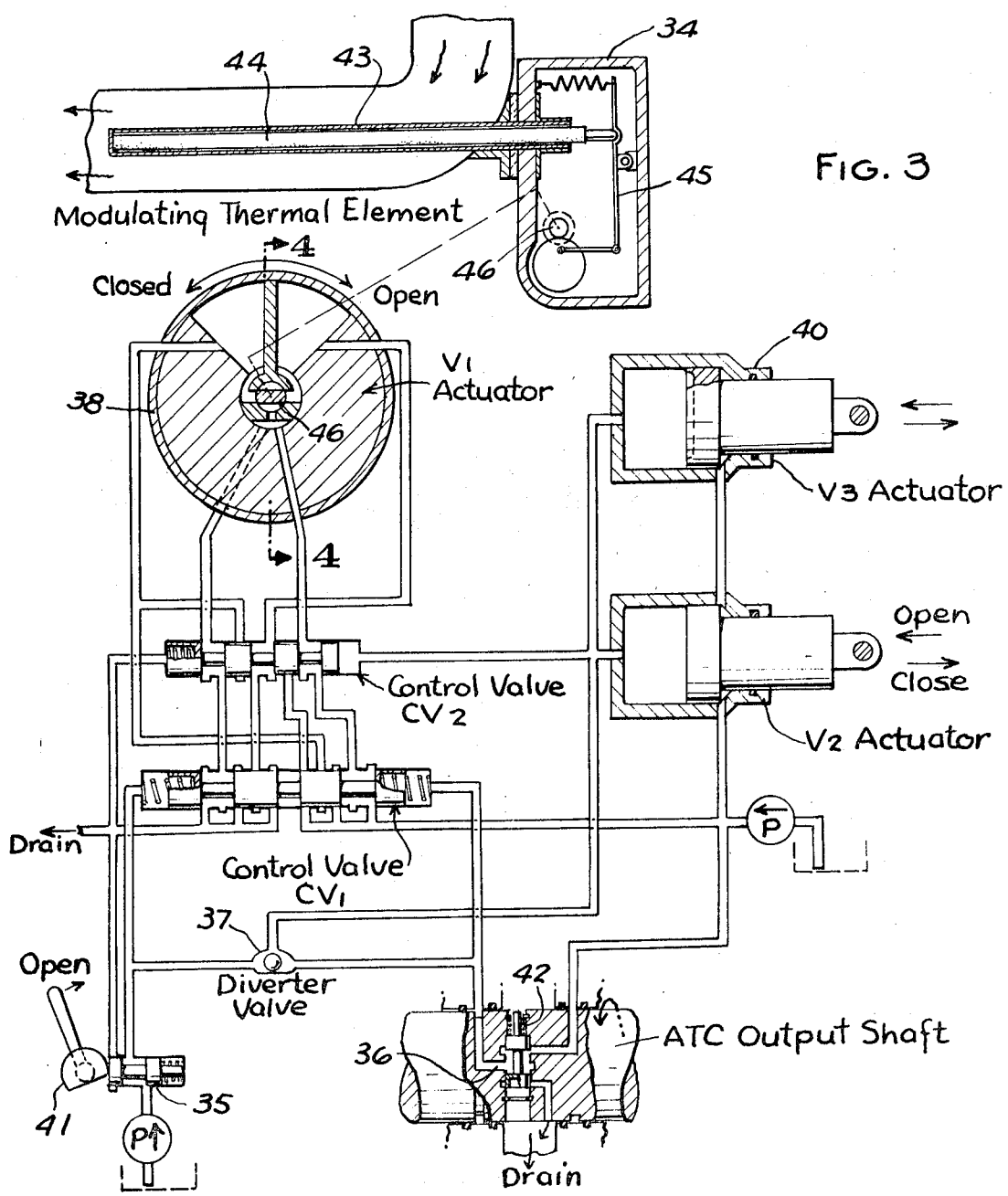
FIG. 3 is a more detailed schematic diagram of the control portion.
Figure 4:
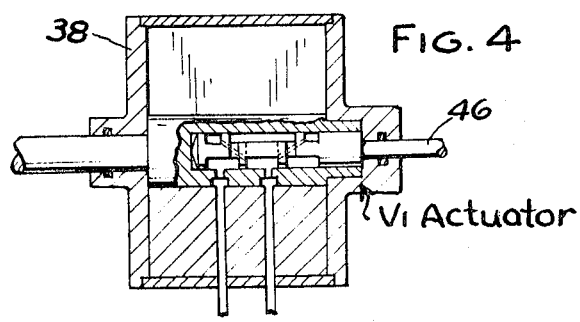
FIG. 4 is a longitudinal sectional view of a part of the control portion of the system.

FIG. 2 is a schematic of the control system showing the function of each component. The hydraulic elements of the system preferably use the pressurized engine lubrication oil as the driving fluid. The control system components comprise a modulating thermal element 34, throttle signal valve 35, a speed signal valve 36, a diverter valve 37 and actuators 38, 39 and 40 for the valves $V_1$, $V_2$ and $V_3$, respectively (FIG. 3). Throttle signal valve 35 comprises a two position cam operated spool valve that gives a pressure signal when the throttle is open and no signal when the throttle is closed. The cam 41 is mechanically attached to the engine throttle.

Speed signal valve 36 comprises a spool valve that is eccentrically mounted to and driven by the aerodynamic converter output shaft 27. Centrifugal force due to rotation of the shaft causes the valve to move outward against a spring 42 and opens the signal port to line pressure. Thus, a pressure signal is provided when the shaft is rotating and no signal exists when the shaft is stalled.

Diverter valve 37 comprises a free floating ball valve that has the speed signal fed into one end and throttle signal into the other. The output from this valve is taken off at its center and feeds the $V_2$ and $V_3$ actuators 39, 40. When the throttle signal and/or speed signal are present, pressure is fed to the $V_2$ and $V_3$ actuators to close their respective valves.

$V_2$ and $V_3$ actuators 39, 40, comprise differential area linear piston actuators. The smaller area is at the output end. Full line pressure is always applied to the smaller area and the output signal from diverter valve 37 is applied to the large area. When the pressure from diverter valve 37 is applied to the smaller area the pistons are extended to close valves $V_2$ and $V_3$. When the throttle is closed and the aerodynamic converter output is stalled, the throttle signal and speed signal are both open to drain, and line pressure acting on the output ends of the pistons causes the pistons to retract thus opening valves $V_2$ and $V_3$.

$V_1$ actuator 38 comprises a rotary vane actuator with a modulating valve in the hub. This valve attaches to the stem of $V_1$ and rotates it directly. Its mode of operation is determined by control valves $CV_1$ and $CV_2$. Modulation in the driving range is by a thermal element that rotates the modulating valve. The vane follows the rotation of the modulating valve and nulls itself by balancing pressures on the two sides of the vane. For stall and coast operation, one side of the vane is drained and the other side is pressurized and the actuator rotates the valve to its full open position. For the start/idle condition the opposite of the above occurs and the valve is rotated to its fully closed position to allow evacuation of the converter.

Control valve $CV_1$ comprises a self-centering spool valve with the speed and throttle signals applied to opposite ends. This valve controls the $V_1$ actuator during the stall and coast modes of operation. When either speed or throttle signal (but not both) are present, the valve is shifted off center and the hydraulic circuit is such that the actuator rotates valve $V_1$ fully open. When the signals are equal, CV, is centered and operation of the actuator is then controlled by the modulating thermal element or control valve $CV_2$.

Control valve $CV_2$ comprises a spool valve that is operated by a signal from the diverter valve 35 and controls the $V_1$ actuator 38 during the start/idle mode. When the speed and/or throttle signal are present, $CV_2$ is open and the actuator is controlled by the modulating thermal element 42 or control valve $CV_1$. When neither signal is present, $CV_1$ is closed and the hydraulic circuit is such that the actuator fully closes valve $V_1$.

Modulating thermal element 34 comprises a thermal element consisting of a closed end stainless steel tube 43 which contains a ceramic rod 44. The differential expansion between the rod and tube due to temperature variations is multiplied thru a gear-lever mechanism 45 which in turn rotates the shaft 46 the modulating valve of the $V_1$ actuator. The sensing portion of the thermal element is installed in the aerodynamic converter cooling flow outlet duct and will control $V_1$ in the driving mode to maintain circuit temperatures to a predetermined value. Air valves for the aerodynamic converter control system are of the minimum flow restriction and low operating torque type. The logic of the system is tabulated below.

| Operating mode | Throttle signal | Speed signal | $V_1$ | $V_2$ | $V_3$ | $V_4$ | Cooling air flow |
|---|---|---|---|---|---|---|---|
| Start/idle | Off | Off | Closed | Open | Open | Closed | No flow. |
| Stall | On | Off | Open | Closed | Closed | Open | Maximum. |
| Driving | On | On | Modulating | do | do | do | Modulated. |
| Coast | Off | On | Open | do | do | do | Maximum. |

The system described represents a minimum control system for a vehicle application of an aerodynamic torque converter. Allowance has been made in the control components for extension of the system functions. For example, it may be desirable to control torque converter input power absorption in the part load range to control turbine inlet temperature or compressor surge of the main gas turbine. This would be done by changing the circuit density by varying the air temperature. The output linkage ratio of the thermal element would be varied by engine compressor pressure or throttle position to vary the value of controlled torque converter circuit air temperature.

I claim:

1. The combination comprising
a compressor,
a gas turbine having a combustor, a rotor and a stator,
and a torque converter,
said torque converter having a casing filled with a compressible fluid, a stator, an input rotor, and an output rotor which is driven by fluid action upon rotation of said input rotor,
said input rotor of said torque converter being connected to and driven by said rotor of said turbine,
a first fluid line between the outlet of said compressor and the interior of said casing of said torque converter,
a second fluid line between the inlet to said gas turbine and said casing,
a hydraulically operated valve in said first fluid line,
said valve being temperature modulated in response to the temperature of the fluid in said torque converter,
a check valve in said second fluid line to prevent backflow into the casing of the torque converter,
an eductor associated with the compressor of the gas turbine engine and operable to evacuate the casing of the aerodynamic torque converter,
a first hydraulically operated on-off valve associated with said eductor for controlling the evacuation of the torque converter,
a second hydraulically operated on-off valve associated with said eductor for controlling the air being directed from the compressor to the eductor,
a throttle signal valve operable when the throttle is open to provide a first hydraulic signal,
a speed signal valve operable upon rotation of the output shaft of said torque converter beyond a predetermined speed to produce a second hydraulic signal,
a diverter valve operable by either of said first and second signals to apply hydraulic pressure to the first and second on-off valves to close said valves.

2. The combination set forth in claim 1 wherein said temperature responsive hydraulic valve comprises a rotary vane actuator.

3. The combination set forth in claim 1 wherein said first and second on-off valves comprise a differential area linear piston actuator.

4. The combination set forth in claim 1 wherein said diverter valve comprises a free floating ball valve to which the speed signal is fed at one end and a throttle signal is fed at the other.

5. The combination set forth in claim 1 wherein said speed signal valve comprises an eccentrically mounted spool valve driven by the output of the aerodynamic torque converter.

6. The combination set forth in claim 1 wherein said throttle signal valve comprises a two-position can operated spool valve.

7. The combination set forth in claim 1 wherein said thermal responsive means consists of a closed end tube containing a ceramic rod,
said rod being operable due to differential expansion between the rod and tube to produce a relative displacement and means operable by said ceramic rod for actuating the modulating valve.

8. The combination comprising
a compressor,
a gas turbine having a combustor, a rotor and a stator,
and a torque converter,
said torque converter having a casing filled with a compressible fluid, a stator, an input rotor, and an output rotor which is driven by fluid action upon rotation of said input rotor,
said input rotor of said torque converter being connected to and driven by said rotor of said turbine,
a first fluid line between the outlet of said compressor and the interior of said casing of said torque converter,
a second fluid line between the inlet to said gas turbine and said casing,
a hydraulically operated valve in said first fluid line,
said valve being temperature modulated in response to the temperature of the fluid in said torque converter,
means operable to evacuate the casing of the aerodynamic torque converter,
a hydraulically operated on-off valve associated with said last mentioned means for controlling the evacuation of the torque converter,
a throttle signal valve operable when the throttle is open to provide a first hydraulic signal,
a speed signal valve operable upon rotation of the output of said torque converter beyond a predetermined speed to produce a second hydraulic signal,
a diverter valve operable by either of said first and second signals to apply hydraulic pressure to said on-off valves to close said valve.

9. The combination set forth in claim 8 wherein said temperature responsive hydraulic valve comprises a rotary vane actuator.

10. The combination set forth in claim 8 wherein said on-off valve comprises a differential area linear piston actuator.

11. The combination set forth in claim 8 wherein said diverter valve comprises a free floating ball valve to which the speed signals are fed at one end and a throttle signal is fed at the other.

12. The combination set forth in claim 8 wherein said speed signal valve comprises an eccentrically mounted spool valve driven by the output of the aerodynamic torque converter.

13. The combination set forth in claim 8 wherein said throttle signal valve comprises a two-position can operated spool valve.

14. The combination set forth in claim 8 wherein said thermal responsive means consists of a closed end tube containing a ceramic rod, said rod being operable due to differential expansion between the rod and tube to produce a relative displacement and means operable by said ceramic rod for actuating the modulating valve.

\* \* \* \* \*